(12) United States Patent
Frondozo et al.

(10) Patent No.: US 7,444,360 B2
(45) Date of Patent: Oct. 28, 2008

(54) METHOD, SYSTEM, AND PROGRAM FOR STORING AND USING METADATA IN MULTIPLE STORAGE LOCATIONS

(75) Inventors: Rhea Reyes Frondozo, Tucson, AZ (US); Kurt Allen Lovrien, Tucson, AZ (US); Richard Anthony Ripberger, Tucson, AZ (US); Jacob Lee Sheppard, Tucson, AZ (US); Michael P. Vageline, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 346 days.

(21) Appl. No.: 10/991,664

(22) Filed: Nov. 17, 2004

(65) Prior Publication Data

US 2006/0106898 A1 May 18, 2006

(51) Int. Cl.
*G06F 7/00* (2006.01)
(52) U.S. Cl. .................................. 707/201; 707/10
(58) Field of Classification Search .................... 707/10
See application file for complete search history.

(56) References Cited

U.S. PATENT DOCUMENTS

| | | | |
|---|---|---|---|
| 5,325,497 A | 6/1994 | Jaffe et al. | |
| 5,909,691 A | 6/1999 | Schultz et al. | |
| 5,960,194 A | 9/1999 | Choy et al. | |
| 6,078,999 A | 6/2000 | Raju et al. | |
| 6,266,740 B1 | 7/2001 | Don et al. | |
| 6,499,039 B1 * | 12/2002 | Venkatesh et al. | 707/204 |
| 6,745,147 B2 | 6/2004 | Ahrens, Jr. et al. | |
| 6,889,309 B1 * | 5/2005 | Oliveira et al. | 711/203 |
| 7,130,956 B2 * | 10/2006 | Rao | 711/3 |
| 2002/0024963 A1 | 2/2002 | Reeve | |
| 2002/0053008 A1 | 5/2002 | Goodman et al. | |
| 2002/0143976 A1 * | 10/2002 | Barker et al. | 709/231 |
| 2003/0182322 A1 * | 9/2003 | Manley et al. | 707/201 |
| 2003/0195903 A1 * | 10/2003 | Manley et al. | 707/201 |
| 2003/0221165 A1 * | 11/2003 | Young et al. | 715/505 |
| 2004/0025008 A1 * | 2/2004 | Kuehn et al. | 713/151 |
| 2004/0039892 A1 | 2/2004 | Goldschmidt | |
| 2004/0044863 A1 | 3/2004 | Trimmer et al. | |
| 2004/0088333 A1 * | 5/2004 | Sidman | 707/201 |
| 2004/0098547 A1 | 5/2004 | Ofek et al. | |
| 2004/0143713 A1 | 7/2004 | Niles et al. | |
| 2004/0167934 A1 * | 8/2004 | Margolus et al. | 707/201 |
| 2004/0167935 A1 * | 8/2004 | Margolus | 707/201 |
| 2004/0172501 A1 * | 9/2004 | Ukai et al. | 711/112 |
| 2004/0215644 A1 * | 10/2004 | Edwards et al. | 707/100 |
| 2004/0220791 A1 * | 11/2004 | Lamkin et al. | 703/11 |
| 2006/0095470 A1 * | 5/2006 | Cochran et al. | 707/104.1 |

* cited by examiner

*Primary Examiner*—Don Wong
*Assistant Examiner*—Kim T Nguyen
(74) *Attorney, Agent, or Firm*—David W. Victor; Konrad Raynes & Victor LLP (57) ABSTRACT

Provided are a method, system, and program for storing and using metadata in multiple storage location. Signature data is stored in a system storage indicating a plurality of metadata copy locations, each locating identifying a storage device and a copy location within the storage device. Each location contains one copy of the metadata, wherein the metadata includes system configuration information. A copy of the signature data is stored with each copy of the metadata.

33 Claims, 8 Drawing Sheets

Signature Data

FIG. 3

Metadata Record

METHOD, SYSTEM, AND PROGRAM FOR STORING AND USING METADATA IN MULTIPLE STORAGE LOCATIONS

BACKGROUND OF THE INVENTION

1. Field of the Invention

The present invention relates to a method, system, and program for storing and using metadata in multiple storage locations.

2. Description of the Related Art

In certain computing environments, multiple host systems may communicate with multiple control units, such as an IBM Enterprise Storage Server (ESS)®, for data in a storage device managed by the ESS receiving the request, providing access to storage devices, such as interconnected hard disk drives through one or more logical paths. (IBM and ESS are registered trademarks of IBM). The interconnected drives may be configured as a Direct Access Storage Device (DASD), Redundant Array of Independent Disks (RAID), Just a Bunch of Disks (JBOD), etc. The control units maintain critical metadata in local storage that is needed to determine the configuration of the system. If the critical metadata is corrupted, invalid or unavailable, then the control unit will fail and may have to be completely reconfigured. The critical metadata is typically hidden from the host system and only available to the control unit operating system.

SUMMARY

Provided are a method, system, and program for storing and using metadata in multiple storage location. Signature data is stored in a system storage indicating a plurality of metadata copy locations, each locating identifying a storage device and a copy location within the storage device. Each location contains one copy of the metadata, wherein the metadata includes system configuration information. A copy of the signature data is stored with each copy of the metadata.

DETAILED DESCRIPTION

Figure 1:
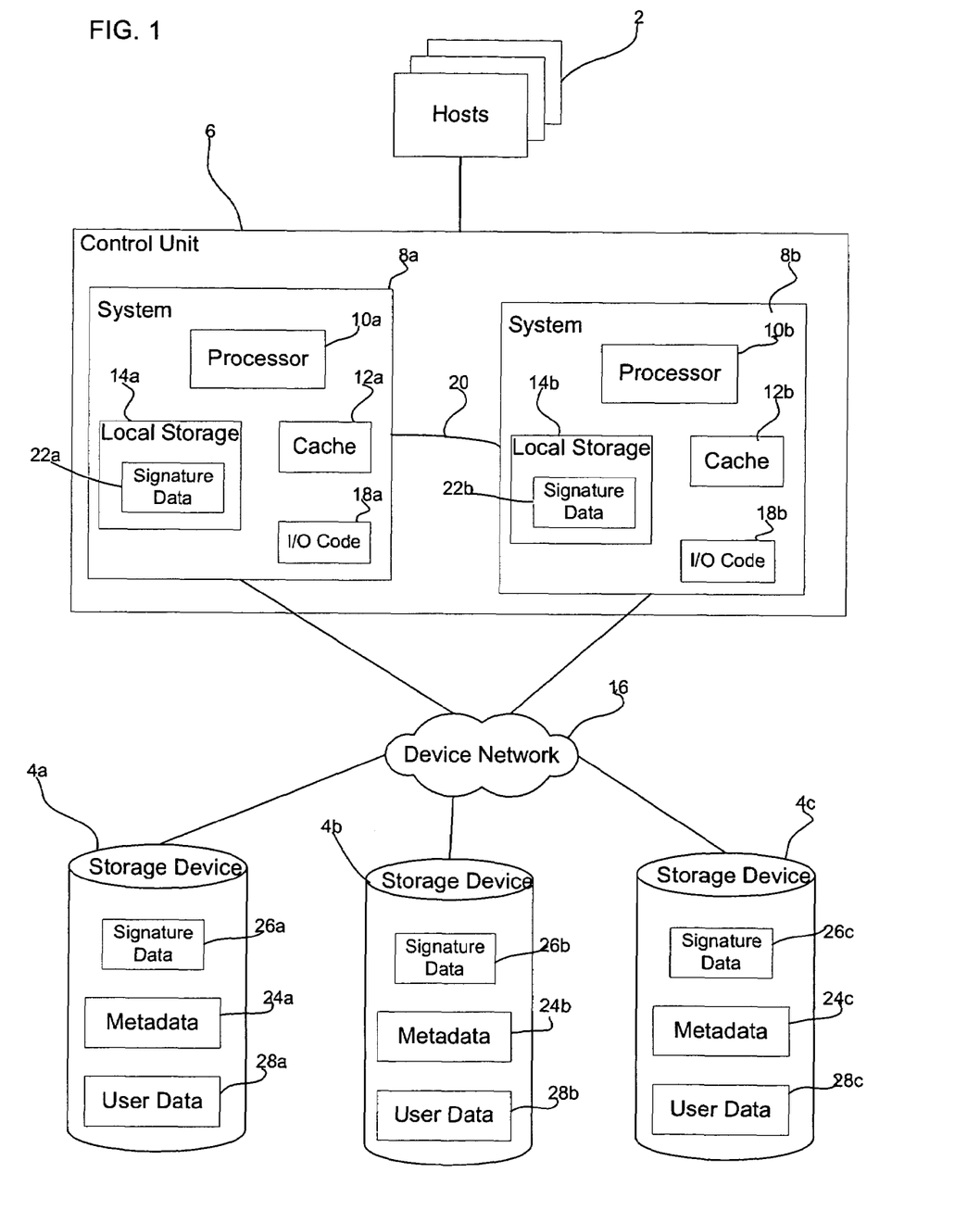
FIG. 1 illustrates an embodiment of a computing environment in which embodiments are implemented.

FIG. 1 illustrates an embodiment of a computing environment in which aspects of the invention are implemented. One or more hosts 2 communicate Input/Output (I/O) requests directed to storage devices 4a, 4b . . . 4n to a control unit 6, where the control unit 6 manages I/O access to the storage devices 4a, 4b . . . 4n. In one embodiment, the control unit 6 is comprised of two systems 8a, 8b, each including a processor 10a, 10b, a cache 12a, 12b, and a local storage 14a, 14b. Each system 6a, 6b may be on separate power boundary. The two systems 8a, 8b may cooperate as a redundancy pair to perform the operation of the control unit such that in the event of a failure of either system, the remaining system takes over the operation of the control unit in a non-disruptive manner. The systems 6a, 6b may be assigned to handle I/O requests directed to specific volumes configured in the storage devices 4a, 4b . . . 4n. The systems 6a, 6b communicate with the storage devices 4a, 4b . . . 4n over a device network 16, which may comprise a local area network (LAN), storage area network (SAN), bus interface, serial interface, etc. The processors 8a, 8b execute I/O code 18a, 18 to perform I/O and metadata management operations described herein. The local storage 14a, 14b may comprise a memory or a memory that is loaded from a non-volatile storage device.

The control unit 6 may comprise any type of server, such as an enterprise storage server, storage controller, etc., or other device used to manage I/O requests to attached storage devices 4a, 4b . . . 4n, where the storage devices may comprise storage devices known in the art, such as interconnected hard disk drives (e.g., configured as a DASD, RAID, JBOD, etc.), magnetic tape, optical disks, electronic memory, etc. The hosts 2 may communicate with the control units 6 over a network (not shown), such as a Local Area Network (LAN), Storage Area Network (SAN), Wide Area Network (WAN), wireless network, etc. Alternatively, the hosts 2 may communicate with the control unit 6 over a bus interface, such as a Peripheral Component Interconnect (PCI) bus or serial interface. The processors 10a, 10b may communicate with each other over a connection 20 to handle failover or fallback.

The systems 8a, 8b maintain signature data 22a, 22b in their local storage 14a, 14b that indicates the location of copies of metadata 24a, 24b, 24c in the storage devices 4a, 4b, 4c. Copies of the signature data 26a, 26b, 26c are also maintained with the metadata 24a, 24b, 24c. The copies of the metadata 24a, 24b, 24c may comprise critical metadata including critical configuration information needed for the control unit 6 to operate. If the critical metadata becomes corrupted or is unavailable, then the location and configuration of volumes on the storage devices may be lost and the control unit 6 may need to be reconfigured. The storage devices 4a, 4b, 4c further include user data 28a, 28b, 28c the hosts 2 access.

There may be more than the three storage devices 4a, 4b, 4c shown and certain storage devices may not include copies of metadata and signature data. Further, one storage device may include multiple copies of the signature data and metadata. In one embodiment, three copies of metadata and signature data are stored in one or more storage devices. In alternative embodiments, a different number of copies of metadata and signature data may be maintained.

Figure 2:
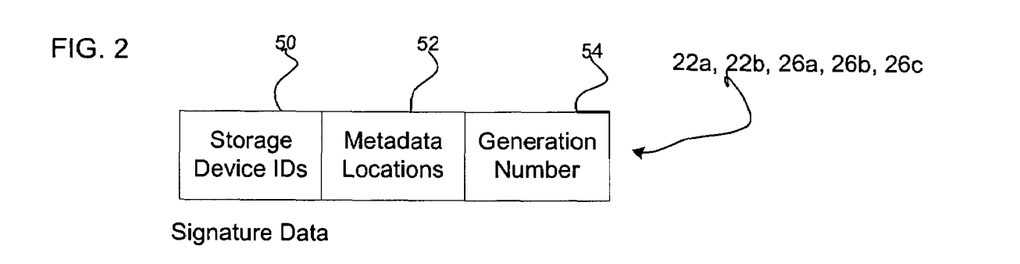
FIG. 2 illustrates an embodiment of signature data information.

FIG. 2 illustrates an embodiment of information included with the signature data 22a, 22b, 26a, 26b, 26c, system identifiers (IDs) 50 indicating the systems, e.g., 8a, 8b, for which the metadata identified by the signature data is intended; metadata locations 52 which identify one or more locations in the storage devices 4a, 4b, 4c where a copy of metadata is to be found, each metadata location identifying a storage device 4a, 4b, 4c and, if more than one copy of metadata can be located on a storage device 4a, 4b, 4c, the identifier of the copy location on the identified storage device 4a, 4b, 4c; and a generation number 54 incremented whenever the contents of the signature is modified due to a change in the metadata locations. The metadata 24a, 24b, 24c may be stored at a predesignated location in the storage devices, known to the I/O code 18a, 18b, such that identifying the storage devices in the storage device IDs 54 provides sufficient information to locate the metadata 24a, 24b, 24c and signature data 26a, 26b, 26c in the storage devices 4a, 4b . . . 4n.

Alternatively, there may be pointer metadata on the storage device at a location known to the I/O code that further identifies the locations of the copies of metadata on the storage device such that identifying the storage devices in the storage device IDs 54 and the identifier of a copy number on each storage device provides sufficient information to locate the pointer metadata on that storage device and the pointer metadata provides the location of the metadata copies 24a, 24b, 24c and their signature data 26a, 26b, 25 26c on the storage devices 4a, 4b . . . 4n. If the storage device is a RAID array, each incarnation of a RAID array has a unique identifier. In one embodiment, the set of identified metadata locations in the signature data is ordered such that there is a 1st through Nth copy indicated. The ordering may be used to control algorithms used to validate signatures and access metadata as described subsequently.

Figure 3:
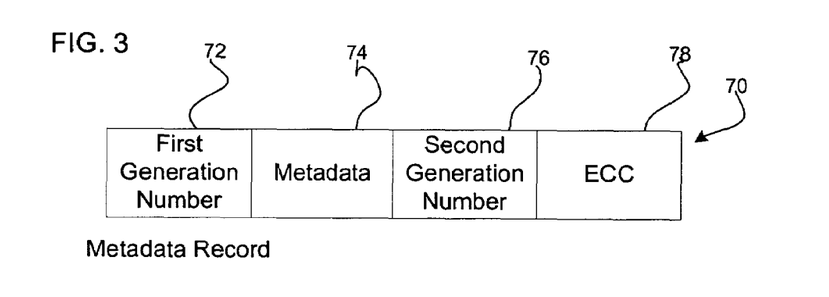
FIG. 3 illustrates an embodiment of information in a metadata record.

FIG. 3 illustrates an embodiment of information included with a metadata record 70. In one embodiment, the metadata 24a, 24b, 24c may be comprised of multiple metadata records. Each metadata record 70 may include a first and second generation numbers 72, 74 indicating a number of times the metadata record is updated, the actual metadata 76, and a error correction code (ECC) or a longitudinal redundancy check (LRC) code used to ensure the metadata record has not become corrupted.

The operations to use and manage metadata described in FIGS. 4, 5, 6, and 8 may be performed in a control unit that includes only one system or processor complex, i.e., no redundant hardware, or a control unit including two systems 8a, 8b such as shown in FIG. 1.

In one embodiment, there may be N candidate storage devices to store a copy of metadata on, each with M possible locations to store a copy of the metadata. As such there are N×M potential locations for the metadata to be stored. The control unit attempts to maintain K valid copies of the metadata, If K>N×M, then only N×M copies can be maintained. In one embodiment, K>=2 and N×M>=2 such that there are at least two copies of the metadata that are available to the control unit at any given time. Having at least two copies makes it possible to recover from a media error that corrupts a portion of one of the copies of the metadata. In another embodiment, K=3 and M=2 such that even when there is only one storage device on which to store metadata, there are at least two copies available on that storage device and when there are at least two storage devices on which to store metadata, there are three copies available, with at least two copies on independent storage devices.

Figure 4:
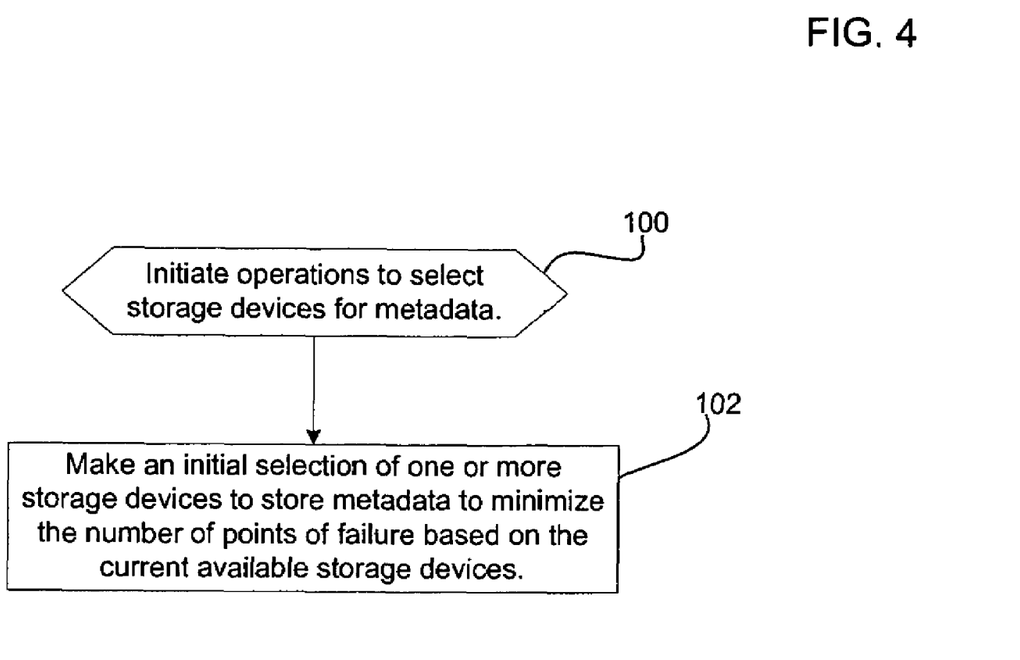
FIGS. 4-9 illustrate embodiments of operations to manage and use metadata and signature data.

FIG. 4 illustrates an embodiment of operations implemented in the I/O code 18a and/or 18b (the operations of FIG. 4 may be implemented on a control unit having one processor/system or multiple processors/system) executed by the processors 10a, 10b to provide an initial copy of the metadata. Upon initiating operations (at block 100) to select the optimal homes for metadata copies, the I/O code 18a, 18b makes (at block 102) an initial selection of one or more storage devices 4a, 4b, 4c to store metadata to minimize the number of points of failure based on the current available storage devices by preferring to place 20 copies of the metadata in storage devices in different failure boundaries (e.g. on independent storage devices, on storage devices with independent access paths, on storage devices with independent power boundaries, etc.) or in locations where greater reliability is provided,(e.g. on higher reliability storage devices, on arrays with better RAID redundancy, on RAID arrays that are not degraded due to failing devices, on storage devices with more independent access paths, etc.).

As the set of available storage devices changes, the set of optimum metadata homes is reevaluated and the placement of the copies of the metadata is rearranged as required to keep the copies on a set of optimum homes. The evaluation of the set of optimum homes must be performed whenever the available set of metadata homes changes. This set may change asia result of adding or deconfiguring storage devices or as result of a storage device failure or repair. An initialized copy of metadata is created when the first storage device becomes available. As additional homes are added or removed, one or more existing copies of metadata may be moved from an existing home to a new home. The value of the signature data that is applicable changes each time the set of metadata homes used to store the metadata copies is modified. The generation number 54 (FIG. 2) of the signature data is incremented each time the signature data changes.

When a new copy of metadata is to be created or an existing copy of metadata is to be removed (or has become inaccessible), the signature data for the control unit must be updated. In the case of migrating a metadata copy from an existing home (storage device 4a, 4b, 4c) to a more optimal home, the existing copy can be removed and then a new copy created.

Figure 5:
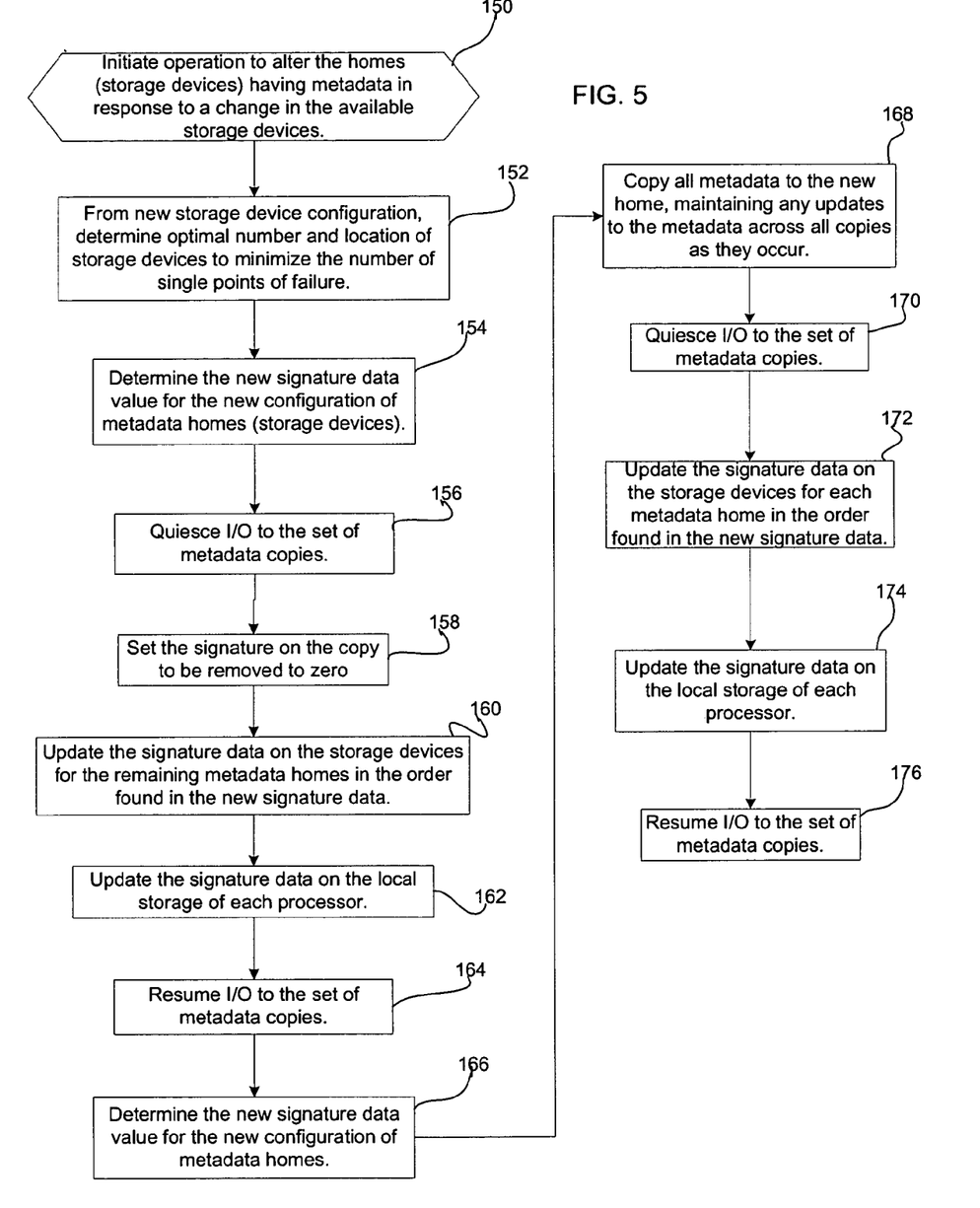

FIG. 5 illustrates an embodiment of operations to remove a copy and create a new copy in order to update the signature data 50 when the configuration of the available storage devices 4a, 4b, 4c changes, thereby causing a readjustment to select the optimal homes (storage devices 4a, 4b, 4c . . . 4n) for the metadata to minimize the number of points of failure based on the current available storage devices as discussed above. Upon initiating (at block 150) an operation to alter the homes (storage devices 4a, 4b, 4c) for the metadata, from the new storage device configuration, the I/O code 18a, 18b determines (at block 152) an optimal number and location of storage devices 4a, 4b, 4c for the metadata 70 to minimize the number of single points of failure. The I/O code performs operations 156 through 164 to remove the existing copy of the metadata 70. A determination is made (at block 154) of the new signature data value 22a, 22b, 26a, 26b, 26c for the new configuration of metadata homes (optimal storage device 4a, 4b, 4c selection). I/Os are quiesced (at block 156) to the set of metadata copies 24a, 24b, 24c. The signature data value 22a, 22b, 26a, 26b, 26c are set (at block 158) to zero on the copy being removed and the signature data values 26a, 26b, 26c on the newly selected optimal storage devices 4a, 4b, 4c are updated (at block 160) in the order indicated in the new signature data. The signature data values 22a, 22b on the local storage 14a, 14b of each system 8a, 8b are also updated (at block 162) and I/O resumes (at block 164) to the set of metadata copies 24a, 24b, 24c.

The I/O code performs operations 166 through 176 to add a new copy of the metadata 70. The I/O code 18a, 18b determines (at block 166) the new signature data value for the new configuration of metadata homes and copies (at block 168) all metadata to the new homes, maintaining any updates to the metadata across all copies as they occur. The I/O code 18a, 18b quiesces (at block 170) I/O to the set of metadata copies 24a, 24b, 24c and updates (at block 172) the signature data 26a, 26b, 26c on the storage devices 4a, 4b, 4c for each metadata home in the order found in the new signature data. The signature data 22a, 22b on the local storage 14a, 14b of each system 8a, 8b is also updated (at block 174) and I/O then resumes (at block 176) to the set of metadata copies 24a, 24b, 24c.

In the embodiment of FIG. 5, the update of the signatures is done while I/O to the metadata copies is suppressed such that the transition to the new signatures happens as an atomic operation with all copies having the same metadata at the point the signatures are modified. At the end of the signature update process, all copies of the signature should be current on all local and storage device copies and any storages without a metadata copy should not have a signature provided that all these signature locations are accessible. However, in cases where there is only one processor online or where a storage device is inaccessible, older generations of signature may be left in place. If the update process is disrupted by a power loss, the signatures may be left in a transitional state.

The signatures are updated in a specific order so that other algorithms can be defined to resolve a valid data signature under reset conditions as described subsequently.

When one or both systems 8a, 8b of the control unit 6 power up and begin the operation of the control unit 6, the system(s) 8a, 8b must first locate the valid copies of the current metadata 24a 24b, 24c. A copy of the signature data 26a, 26b, 26c is maintained with each copy of the metadata and is also stored locally, i.e., in local storage 14a, 14b, on each system 8a, 8b. The process of locating the current metadata is complicated by the fact that: not all the storage devices may be accessible to the operational system(s) due to failures; the signatures may have been in the middle of being updated when a power loss occurred; one of the systems may not have been operational and its local signature data may be out of date with any changes to the location of the metadata made by the other operational server; either one or both of the systems 8a, 8b may be operational at the point of the power up.

The I/O code 18a, 18b may validate that the current copies of metadata 24a, 24b, 24c have been located with a certain degree of confidence. The signature data 22a, 22b, 26a, 26b, 26c determines the location of the currently valid metadata 24a, 24b, 24c, so that the I/O code 18a, 18b need only determine the validity of the signature data 226a, 26b, 26c. If valid signature data is not determined, then the control unit 6 does not go online to the attached hosts 2 and calls for service to let a service person attempt to sort out what copy if any of the metadata should be used. If at least one valid copy of metadata 24a, 24b, 24c can be located, then the system(s) 8a, 8b make additional copies of the metadata as previously described so that that the appropriate number of valid copies exist. The signature data 26a, 26b, 26c in the storage devices 4a, 4b, 4c in the local signature data 22a, 22b is updated to reflect the current valid copies once the location of one or more copies is determined. The algorithm to determine a valid signature may depend on the procedure used to update the copies of the signature data when the applicable signature changes for the control unit.

Figure 6:
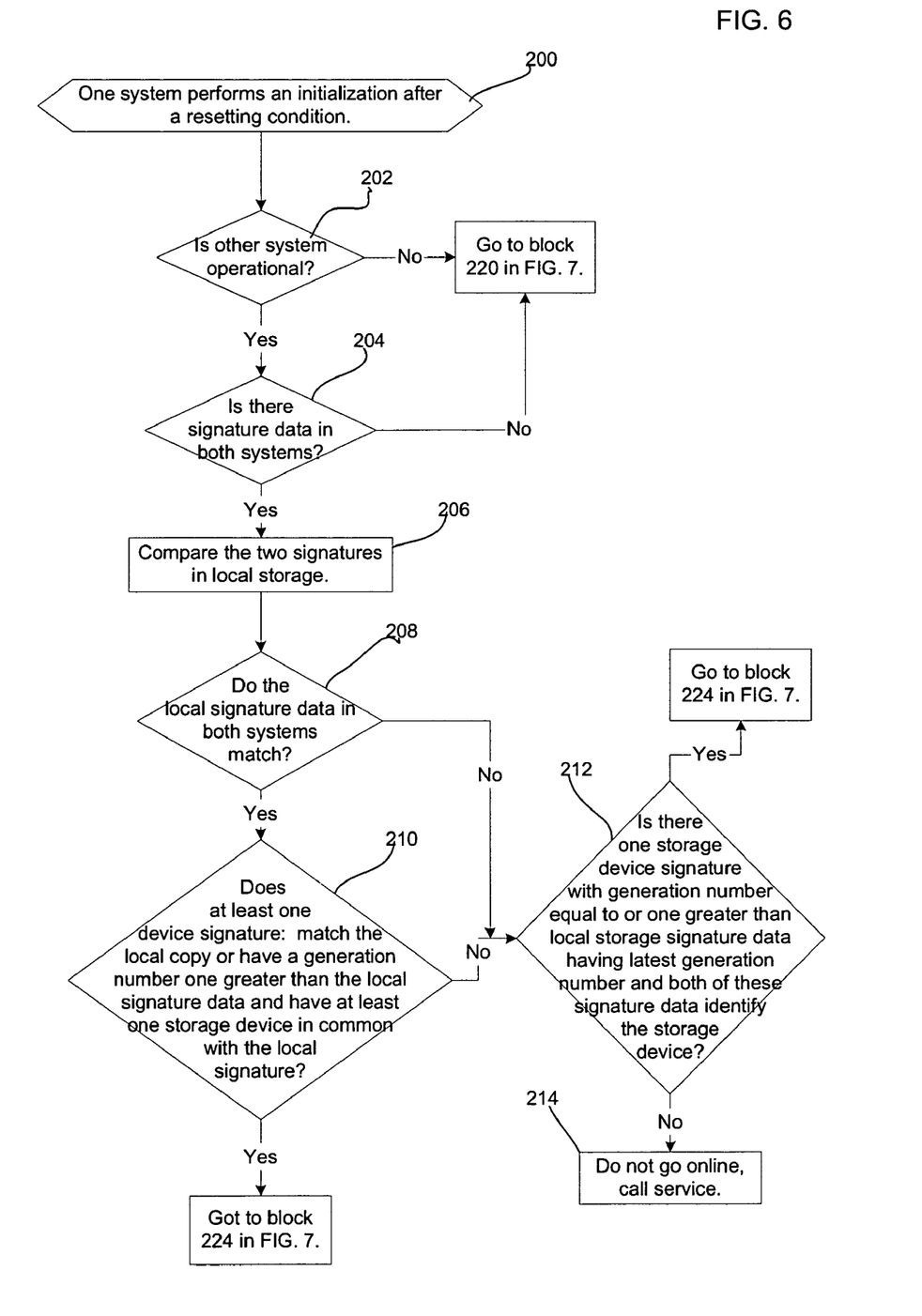
Figure 7:
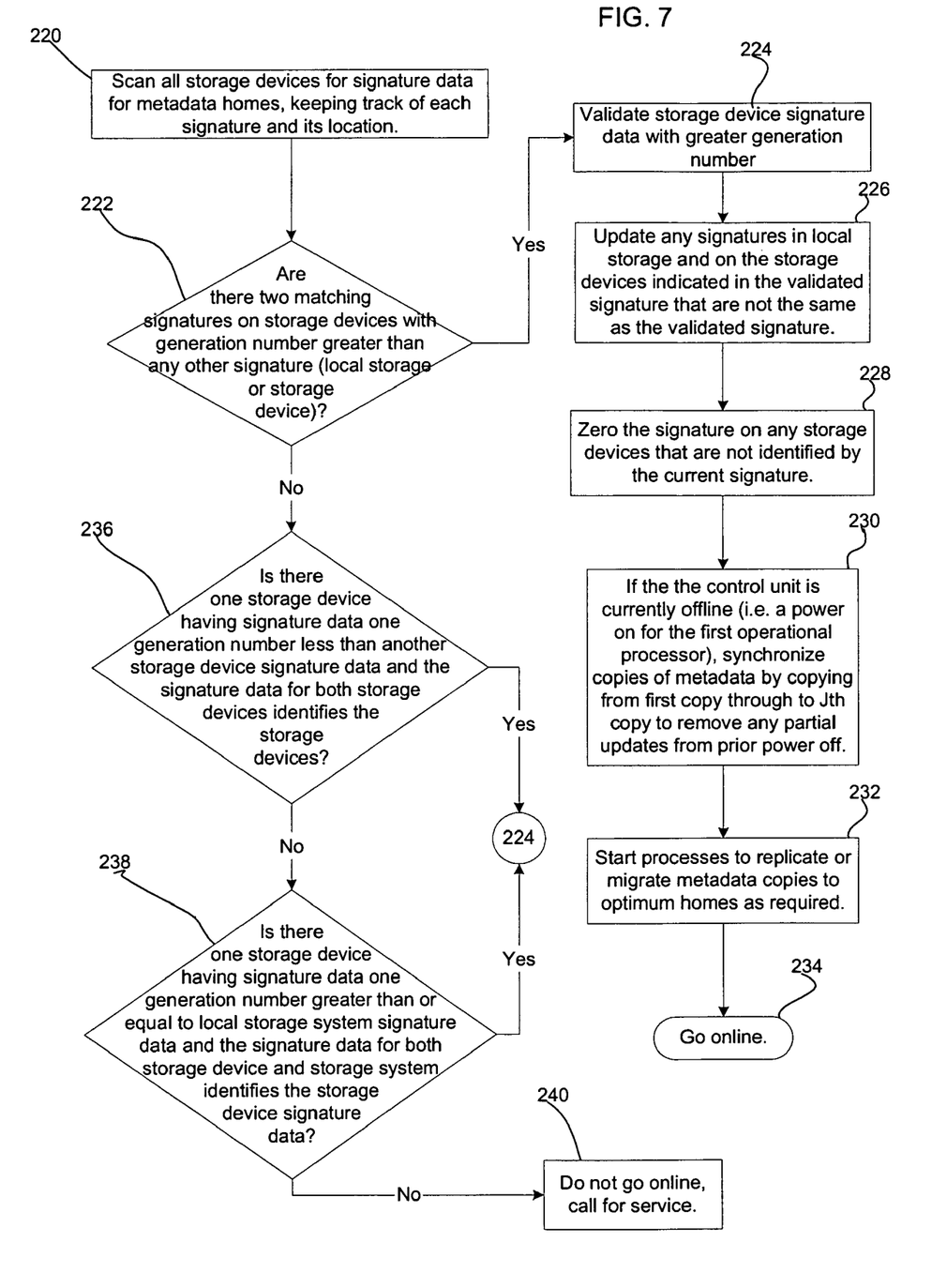

FIGS. 6 and 7 illustrate one embodiment of operations to validate a copy of signature data value 22a, 22b, 26a, 26b, 26c when powering-on or as part of an initial microcode load (IML) operation. At block 200, one system, e.g., 8a, performs an initialization, such as a power-on or IML, after a resetting condition. If (at block 202) the other system, e.g., 8b, is operational and if (at block 204) there is signature data 22a, 22b in both systems 8a, 8b, then the two signature data values 22a, 22b are compared (at block 206). If (at block 208) they both match and if (at block 210) at least one storage device signature data 26a, 26b, 26c both: (1) matches the local storage signature data 22a, 22b or have a generation number 54 one greater than the local storage signature data 22a, 22b and (2) has at least one storage device in common with the local storage signature data 22a, 22b, then control proceeds to block 224 in FIG. 7. Otherwise, from the no branch of block 208 or 210, the I/O code 18a determines (at block 212) whether there is one storage device signature data 26a, 26b, 26c having a generation number 54 equal to or one greater than the local storage signature data 22a, 22b having the latest generation number and both of these local and storage device signature data identify the storage device 4a, 4b, 4c having the generation number equal or greater, then control proceeds to block 224 in FIG. 7. Otherwise, from the no branch of block 212, the control unit 6 does not go online (at block 214 and service may be called.|

If (at block 202) the other system, e.g., 8b, is not operational or if (at block 204) only one system 8a or 8b has signature data 22a or 22b, then control proceeds to block 220 in FIG. 7. At block 220, the I/O code 18a scans all storage devices 4a, 4b, 4c for signature data 26a, 26b, 26c for metadata homes, keeping track of each signature and its location. If (at block 222) there are two matching signature data values 26a, 26b, 26c on storage devices 4a, 4b, 4c with a generation number 54 greater than any other signature data value (local storage 14a or storage device 4a, 4b, 4c), then the storage device signature data 26a, 26b, 26c with the greater generation number is validated (at block 224). The I/O code 18a updates (at block 226) any signature data values 22a, 22b s in local storage 14a, 14b and on the storage devices 4a, 4b, 4c indicated (in field 54 of FIG. 2) in the validated signature data that are not the same as the validated signature data. The signature data 26a, 26b, 26c on any storage devices 4a, 4b, 4c that are not identified by the validated signature data values are zeroed (at block 228). If the control unit 6 is currently offline (i.e. a power on for the first operational processor), then the I/O code 18a synchronizes (at block 230) copies of metadata by copying from the first copy through to the Jth copy to remove any partial updates from prior power off. The I/O code 18a further starts (at block 232) the processes to replicate or migrate metadata copies to optimum homes as required and then goes online (at block 234).

From the no branch of block 222, if (at block 236) there is one storage device having signature data 26a, 26b, 26c one generation number 54 less than another storage device signature data and the signature data for both storage devices identifies the storage devices, then control proceeds to block 224 to validate the signature data value 26a, 26b, 26c with the latest generation number. From the no branch of block 236, if (at block 238) there is one storage device having signature data 26a, 26b, 26c one generation number 54 greater than or equal to local storage 14a signature data value 22a, 22b and the signature data value for the storage device having the greatest generation number and for the storage system identifies the storage device 4a, 4b, 4c having the signature data value 26a, 26b, 26c with the latest generation number 54, then control proceeds to block 224 to validate the storage system signature data 26a, 26b, 26b having the latest generation number one generation greater than the local signature data 22a, 22b. Otherwise, from the no branch of block 238, control proceeds to block 240 to not go online and call for service. Other embodiments of the algorithm may choose different results (online or offline) for the conditions checked or might define additional conditions to check depending on the level of confidence desired in the determination of the validity of the signature.

The signature data value identifies an ordered set of metadata homes with valid copies of the metadata. When any portion (i.e. a record) of the metadata is updated, the updates are made in this order to each metadata copy and the update is not considered complete until all copies have been updated as described subsequently. In the case of a power loss or certain failures that cause discontinuance of the operation of all systems in the control unit, it is possible that not all copies of metadata get updated. To prevent the metadata copies from being out of sync, at power on time, the systems copy the data from the first copy of the metadata to the remaining copies (at block 230 in FIG. 7). Any errors detected on the first copy of the metadata are recovered by using the valid data available on the next successive copy of the metadata. If an update was not in progress on the data in error, then all copies should have had the same data and the recovery restores the current data to all copies. If a partial update was in progress, then taking the data from the next valid successive copy either restores all copies to the version of the metadata that was intended to be updated or restores all copies to the version of the metadata that existed prior to the update. In the first case, the partial update is completed. In the later case, the partial update is nullified. In either case the metadata is restored to a consistent state since the partial update was disrupted before it was complete and the system design must be able to handle that an incomplete partial update either occurred or did not occur.

When any portion (i.e. a record) of the metadata is updated, the updates are made in this order to each metadata copy and the update is not considered complete until all copies have been updated. The updates are serialized to the multiple copies of the metadata so that a power loss does not end up partially updating all three copies resulting in the loss of the metadata in all copies. Read and write accesses to the same portion (i.e. record) of the metadata are generally handled such that there are no read operations allowed while a write operation is in progress. In this case, a read may be issued to any available copy of the metadata (i.e. all copies contain the same data assuming they were synchronized at power on). A read failure (e.g. media error) on any copy is recovered by reading data from another valid copy of metadata until a valid copy of the portion of metadata is found. Once found any copies in error are re-written with valid data. If no valid copy is found and error is returned to the accessor of the data indicating that the data has been lost. In cases where concurrent read and write accesses might occur to the same portion of metadata, the reads are issued in the order that updates are performed so that the latest copy of the metadata is read. If a failure is detected on either a read or a write access that is indicative of a failure of the entire copy of metadata, then that copy is considered inaccessible, removed from the signature data, and a new copy is created in another metadata location, if any are available.

Figure 8:
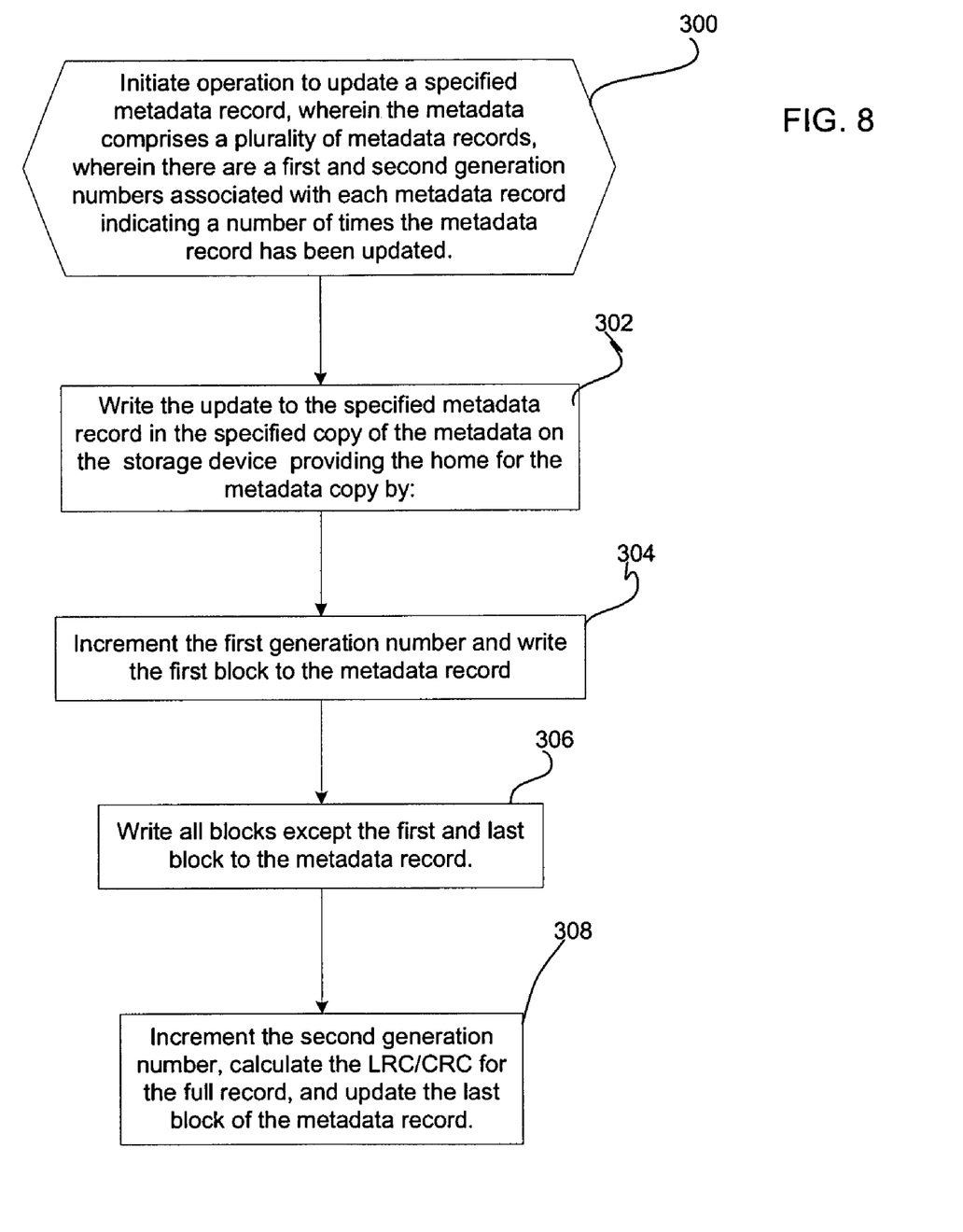

FIG. 8 illustrates an embodiment of operations to update a single metadata record 70 (FIG. 3) in one of the copies 24a, 24b, 24c of the metadata implemented in the I/O code 18a, 18b. (The operations of FIG. 8 may be implemented on a control unit having one processor/system or multiple systems 8a, 8b). Upon initiating operations (at block 300) to update a specified metadata record 70, the update to the specified metadata record is written (at block 302) to each copy of the metadata 24a, 24b, 24c in the at least one storage device 4a, 4b, 4c by performing the operations at blocks 304, 306, and 308 on one record copy at a time. At block 304, the I/O code 18a increments the first generation number 72 and writes the first block to the metadata record 70. All blocks except the first and last block are written (at block 306) to the metadata record 70. The second generation number 76 is incremented (at block 308), the LRC/CRC calculated for the entire metadata record, and the last block is written to the metadata record 70.

Figure 9:
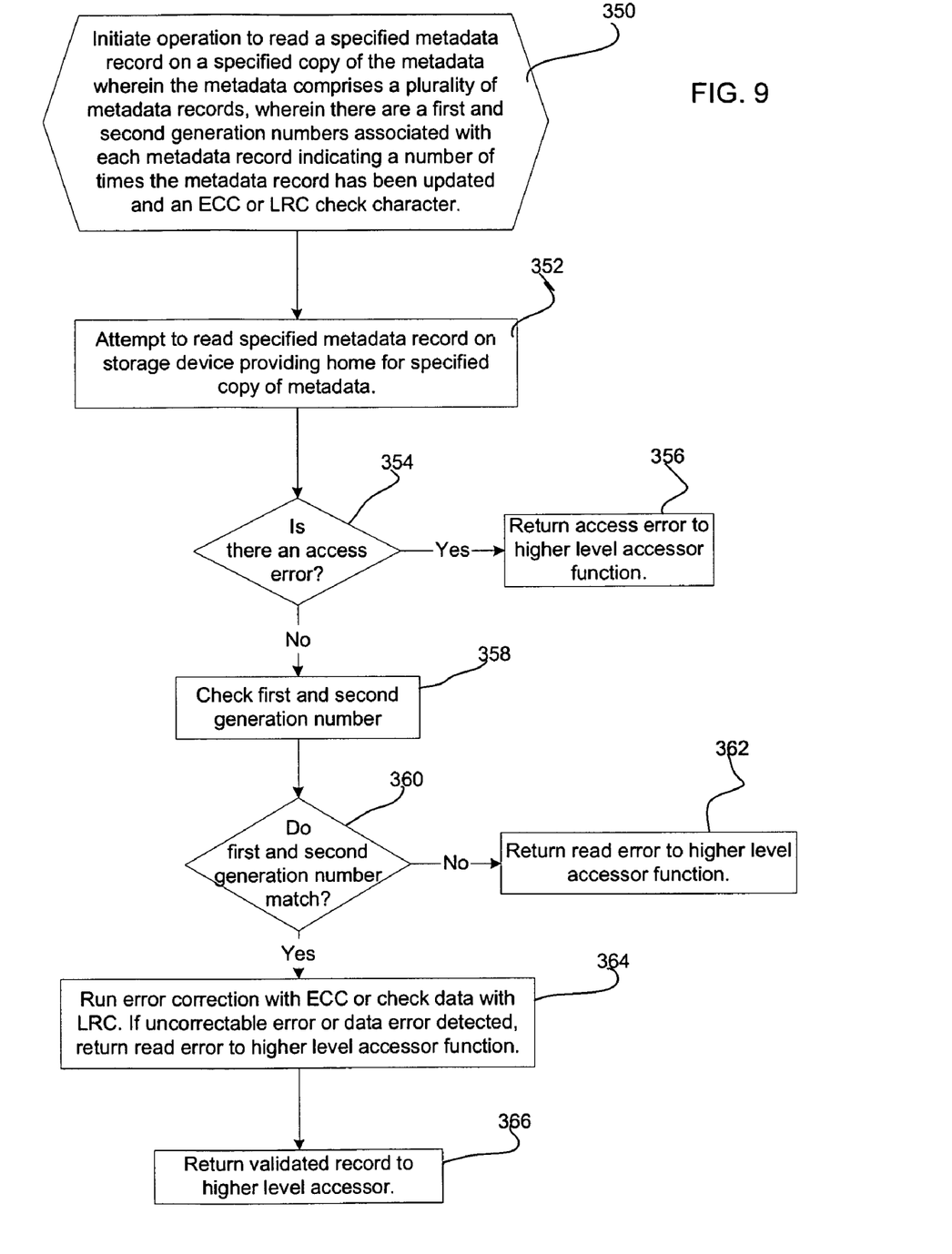

FIG. 9 illustrates an embodiment of operations to read a single metadata record 70 (FIG. 3) in one of the copies 24a, 24b, 24c of the metadata implemented in the I/O code 18a, 18b. (The operations of FIG. 9 may be implemented on a control unit having one processor/system or multiple systems 8a, 8b). At block 350, an operation is initiated to read a specified metadata record 70 on a specified copy of the metadata 24a, 24b, 24c comprising a plurality of metadata records, where there are a first 70 and second 76 (FIG. 3) generation numbers associated with each metadata record 70 indicating a number of times the metadata record has been updated and an ECC or LRC check character. The I/O code 18a attempts (at block 352) to read the specified metadata record 70 on one storage device 4a, 4b, 4c providing a home for the specified copy of the metadata 70. If (at block 354) there is an access error, then the access error is returned (at block 356) to a higher level accessor function. If (at block 354) there is no error, then the first 72 and second 76 generation numbers are checked (at block 358). If (at block 360) they do not match, then a read error is returned (at block 362) to a higher level. If (at block 364) an LRC or uncorrectable CRC error is detected on the metadata record, then a read error is returned to a higher level. If no errors were detected, the metadata record has been validated and is returned to the accessor function.

Additional Embodiment Details

The described embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In one embodiment, the first generation number may be in a first sector of each metadata record and the second generation number in a last sector of the metadata record.

In embodiments having redundant hardware, e.g., systems 8a, 8b, one system 8a or 8b may be designated the master to control the storage devices 4a, 4b, 4c in which copies of the metadata 24a, 24b, 24c are stored. In one embodiment, the master system 8a or 8b may assign copies of the metadata 24a, 24b, 24c to the systems 8a, 8b, such that the systems 8a, 8b manage the locking of their assigned metadata copies 24a, 24b, 24c.

FIGS. 2 and 3 show certain information included in the signature data and metadata records. In alternative embodiments, this information may be stored in different data structures having different formats and information than shown.

The illustrated operations of FIGS. 4-8 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

What is claimed is:

1. A method, comprising:
   generating signature data indicating a plurality of metadata copy locations, each location identifying one of a plurality of storage devices and a copy location within the storage device, wherein each location contains one copy of metadata, wherein the metadata includes system configuration information, wherein each copy of the signature data includes a generation number wherein a first and second processing systems are capable of accessing the metadata and signature data in the storage devices, and wherein the first processing system and second processing system maintain a first and second copy of the signature data, respectively;
   storing a copy of the signature data with each copy of the metadata in the storage devices;
   reading one copy of the metadata from one of the storage devices to obtain system configuration information to use to operate;
   incrementing the generation number in each copy of the signature data in response to changing the locations in which the copy of the metadata is included;
   performing an initialization by the first processing system;
   determining a valid copy of the signature data on one of the storage devices or processing system;
   staying off line in response to determining that no signature data is valid; and
   updating all accessible copies of the signature data in the metadata locations indicated in the determined valid copy of signature data and the first and second copies of the signature data with the validated copy of the signature data.

2. The method of claim 1, wherein the location of the storage devices to store the copies of the metadata are selected to minimize a number of points of failure.

3. The method of claim 1, further comprising:
   initiating an operation to alter the locations of the metadata copies in the storage devices storing the metadata;
   determining new locations in the storage devices for the metadata;
   updating each copy of the signature data to indicate the new locations for the metadata; and
   copy metadata and the updated signature data to any of the new locations that do not already include metadata and signature data.

4. The method of claim 3, wherein the locations within the signature data comprises an ordered set, wherein the signature data is updated at the locations in an order according to the ordered set.

5. The method of claim 3, wherein the determination of the new location is made in response to a change in the set of storage devices and wherein the determination of the new location is performed in order to minimize a number of points of failure for the changed set of the storage devices.

6. The method of claim 1, wherein two processing systems are capable of accessing the metadata and signature data in the storage devices, and wherein each processing system has a computer readable medium including a copy of the signature data.

7. The method of claim 6, further comprising:
   receiving an update to the metadata; and
   serially copying the update to the metadata in the storage devices according to an ordering of the storage device locations indicated in the signature data.

8. The method of claim 6, further comprising:
   receiving a request to read the metadata;
   accessing the metadata in the storage locations until one valid copy of the metadata is found; and
   updating copies of the metadata determined to be invalid with the accessed valid copy of the metadata.

9. The method of claim 1, wherein determining the validity of one copy of the signature data comprises validating one storage device signature data that matches the first and second copies of the signature data or validating one storage device signature data that has a generation number one greater than the generation number of the matching first and second copies of the signature data and where the one storage device signature data and the first and second copies of the signature data identify a common storage device.

10. The method of claim 1, wherein determining the validity of one copy of the signature data comprises validating one storage device signature data that has a generation number equal to or one greater than a largest generation number of the first and second copies of the signature data in response to determining that the generation numbers of the first and second copies of the signature data do not match and that the first and second copies of the signature data identify the validated storage device.

11. The method of claim 1, wherein determining the validity of one copy of the signature data comprises validating one storage device signature data that has a generation number greater by one or equal to the generation number in one of the first and second copies of the signature data in response to determining that signature data in the storage devices identifies the storage devices.

12. A system, comprising:
   a plurality of storage devices
   a first processing system having a system storage and in communication with the storage devices;
   a second processing system, wherein both processing systems are capable of accessing metadata and signature data in the storage devices, and wherein each processing system has a local storage including a copy of the signature data; and
   a computer readable medium including code executed by the first processing system to perform operations comprising:
      generating signature data indicating a plurality of metadata copy locations, each location identifying one of a plurality of storage devices and a copy location within the storage device, wherein each location contains one copy of the metadata, wherein the metadata includes system configuration information, wherein each copy of the signature data includes a generation number;
      storing a copy of the signature data with each copy of the metadata in the storage devices;
      reading one copy of the metadata from one of the storage devices to obtain system configuration information to use to operate;

incrementing the generation number in each copy of the signature data in response to changing the locations in which the copy of the metadata is included;

performing an initialization by the first processing system;

determining a validity of one of the accessible signature data on the storage devices or processing system;

staying off line in response to determining that no signature data is valid; and updating all accessible copies of the signature data in the metadata locations indicated in the validated signature data and the first and second copies of the signature data with the validated copy of the signature data.

13. The system of claim 12, wherein the locations of the storage devices to store the copies of the metadata are selected to minimize a number of points of failure.

14. The system of claim 12, wherein the operations caused by the code further comprises:

initiating an operation to alter the locations of the metadata copies in the storage devices storing the metadata;

determining new locations in the storage devices for the metadata;

updating each copy of the signature data to indicate the new locations for the metadata; and copy metadata and the updated signature data to any of the new locations that do not already include metadata and signature data.

15. The system of claim 14, wherein the locations within the signature data comprises an ordered set, wherein the signature data is updated at the locations in an order according to the ordered set.

16. The system of claim 15, wherein the determination of the new location is made in response to a change in the set of storage devices and wherein the determination of the new location is performed in order to minimize a number of points of failure for the changed set of the storage devices.

17. The system of claim 12, wherein the processing system comprises a first processing system, further comprising:

a second processing system, wherein both processing systems are capable of accessing the metadata and signature data in the storage devices, and wherein each processing system has a local storage including a copy of the signature data.

18. The system of claim 17, wherein the code further causes operations comprising:

receiving an update to the metadata; and serially copying the update to the metadata in the storage devices according to an ordering of the storage device locations indicated in the signature data.

19. The system of claim 17, wherein the code further causes operations comprising:

receiving a request to read the metadata;

accessing the metadata in the storage locations until one valid copy of the metadata is found; and updating copies of the metadata determined to be invalid with the accessed valid copy of the metadata.

20. The system of claim 12, wherein determining the validity of one copy of the signature data comprises validating one storage device signature data that matches the first and second copies of the signature data or validating one storage device signature data that has a generation number one greater than the generation number of the matching first and second copies of the signature data and where the one storage device signature data and the first and second copies of the signature data identify a common storage device.

21. The system of claim 12, wherein determining the validity of one copy of the signature data comprises validating one storage device signature data that has a generation number equal to or one greater than a largest generation number of the first and second copies of the signature data in response to determining that the generation numbers of the first and second copies of the signature data do not match and that the first and second copies of the signature data identify the validated storage device.

22. The system of claim 12, wherein determining the validity of one copy of the signature data comprises validating one storage device signature data that has a generation number greater by one or equal to the generation number in one of the first and second copies of the signature data in response to determining that signature data in the storage devices identifies the storage devices.

23. An article of manufacture comprising at least one of a hardware device having hardware logic and a computer readable storage medium having executable code to communicate with a plurality of storage devices and a system storage and to cause a first and second processing systems to perform operations, the operations comprising:

generating signature data indicating a plurality of metadata copy locations, each location identifying one of a plurality of storage devices and a copy location within the storage device, wherein each location contains one copy of metadata, wherein the metadata includes system configuration information, wherein each copy of the signature data includes a generation number, wherein the first and second processing systems are capable of accessing the metadata and signature data in the storage devices, wherein the first processing system and second processing system maintain a first and second copy of the signature data;

storing a copy of the signature data with each copy of the metadata;

reading one copy of the metadata from one of the storage devices to obtain system configuration information to use to operate;

incrementing the generation number in each copy of the signature data in response to changing the locations in which the copy of the metadata is included;

performing an initialization;

determining a validity of one of the accessible signature data on the storage devices or processing system;

staying off line in response to determining that no signature data is valid; and updating all accessible copies of the signature data in the metadata locations indicated in the validated signature data and the first and second copies of the signature data with the validated copy of the signature data.

24. The article of manufacture of claim 23, wherein the location of the storage devices to store the copies of the metadata are selected to minimize a number of points of failure.

25. The article of manufacture of claim 23, wherein the operations further comprise:

initiating an operation to alter the locations of the metadata copies in the storage devices storing the metadata;

determining new locations in the storage devices for the metadata;

updating each copy of the signature data to indicate the new locations for the metadata; and copy metadata and the updated signature data to any of the new locations that do not already include metadata and signature data.

26. The article of manufacture of claim 25, wherein the locations within the signature data comprises an ordered set, wherein the signature data is updated at the locations in an order according to the ordered set.

27. The article of manufacture of claim 25, wherein the determination of the new location is made in response to a change in the set of storage devices and wherein the determination of the new location is performed in order to minimize a number of points of failure for the changed set of the storage devices.

28. The article of manufacture of claim 23, wherein two processing systems are capable of accessing the metadata and signature data in the storage devices, and wherein each processing system has a computer readable medium including a copy of the signature data.

29. The article of manufacture of claim 28, wherein the operations further comprise:
   receiving an update to the metadata; and
   serially copying the update to the metadata in the storage devices according to an ordering of the storage device locations indicated in the signature data.

30. The article of manufacture of claim 28, wherein the operations further comprise:
   receiving a request to read the metadata;
   accessing the metadata in the storage locations until one valid copy of the metadata is found; and
   updating copies of the metadata determined to be invalid with the accessed valid copy of the metadata.

31. The article of manufacture of claim 23, wherein determining the validity of one copy of the signature data comprises validating one storage device signature data that matches the first and second copies of the signature data or validating one storage device signature data that has a generation number one greater than the generation number of the matching first and second copies of the signature data and where the one storage device signature data and the first and second copies of the signature data identify a common storage device.

32. The article of manufacture of claim 23, wherein determining the validity of one copy of the signature data comprises validating one storage device signature data that has a generation number equal to or one greater than a largest generation number of the first and second copies of the signature data in response to determining that the generation numbers of the first and second copies of the signature data do not match and that the first and second copies of the signature data identify the validated storage device.

33. The article of manufacture of claim 23, wherein determining the validity of one copy of the signature data comprises validating one storage device signature data that has a generation number greater by one or equal to the generation number in one of the first and second copies of the signature data in response to determining that signature data in the storage devices identifies the storage devices.

* * * * *